United States Patent [19]
Gyory

[11] 3,948,530
[45] Apr. 6, 1976

[54] EXTERNALLY ADJUSTABLE MECHANICAL SEAL

[75] Inventor: Emeric J. Gyory, Park Ridge, Ill.

[73] Assignee: Borg-Warner Corporation, Chicago, Ill.

[22] Filed: July 26, 1974

[21] Appl. No.: 492,112

[52] U.S. Cl. .................. 277/3; 277/27; 277/74; 277/59
[51] Int. Cl.² .......................................... F16J 15/40
[58] Field of Search ............... 277/3, 12, 27, 74, 73, 277/59

[56] References Cited
UNITED STATES PATENTS

| | | | |
|---|---|---|---|
| 2,738,996 | 3/1956 | Andersson | 277/3 |
| 3,026,112 | 3/1962 | Mayer | 277/3 |
| 3,034,797 | 5/1962 | Pike | 277/74 X |
| 3,144,253 | 8/1964 | Schirmer | 277/74 X |
| 3,174,759 | 3/1965 | Schwing et al. | 277/73 |
| 3,318,604 | 5/1967 | Tracy | 277/74 X |
| 3,612,544 | 10/1971 | Muller | 277/27 |

Primary Examiner—Samuel B. Rothberg
Attorney, Agent, or Firm—James A. Geppert

[57] ABSTRACT

A high pressure mechanical face seal for prevention of leakage along a rotary shaft, wherein a rotary seal ring is mounted in a holder supported on the rotary shaft and a stationary seal ring is mounted in a plate and has a sealing face engaging the end face of the rotary seal ring. A pair of axially spaced pressure areas on the external surface of the stationary seal ring communicate with pressure lines which are appropriately valved to provide settings for high pressure, low pressure or atmospheric pressure to be exerted on either one or both of the spaced areas and provide hydrostatic loading of the stationary seal ring; resulting in a distortion of the ring to provide either a full face contact, an internal diameter contact or an external diameter contact of the seal faces.

14 Claims, 5 Drawing Figures

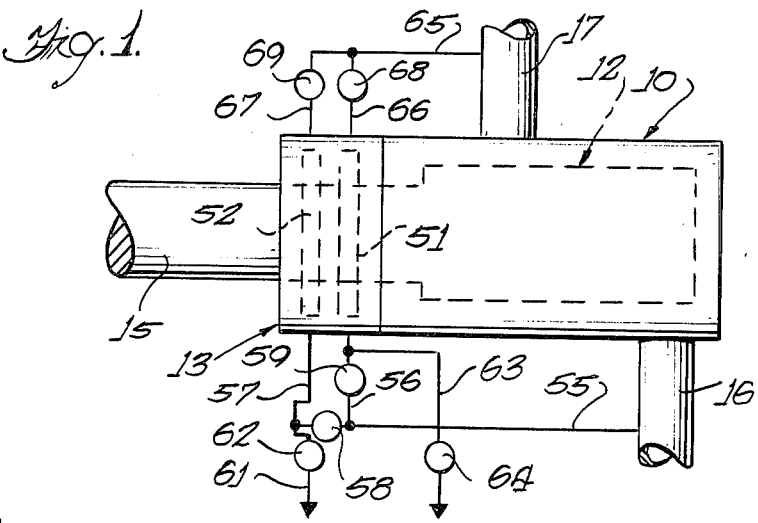
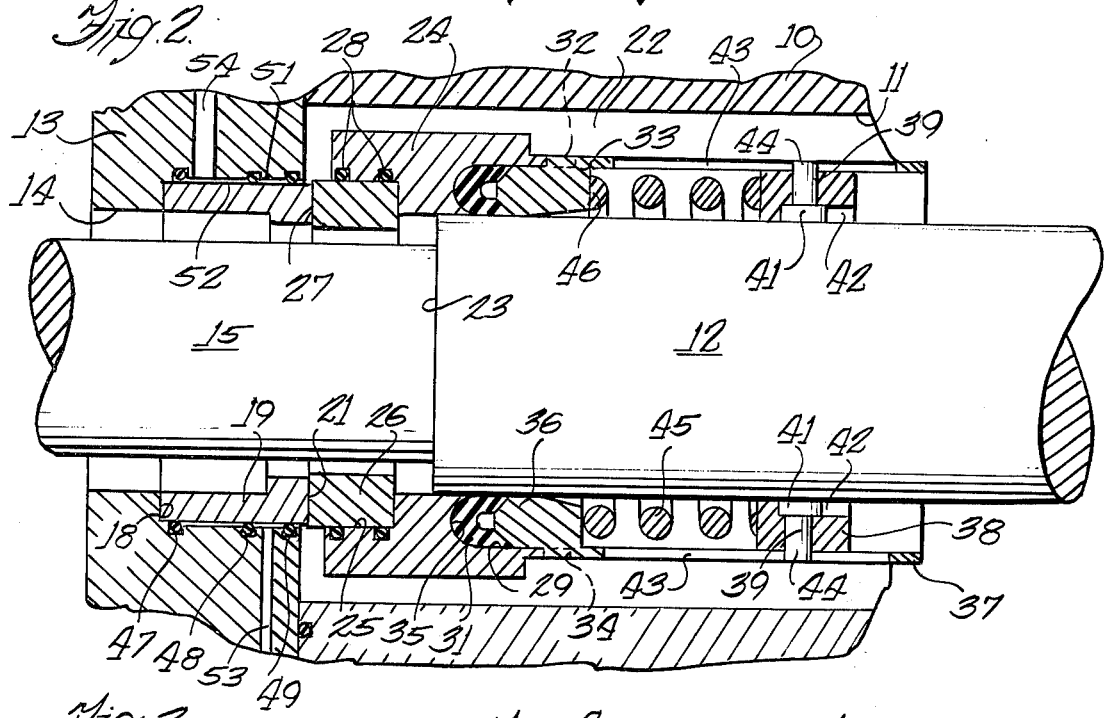
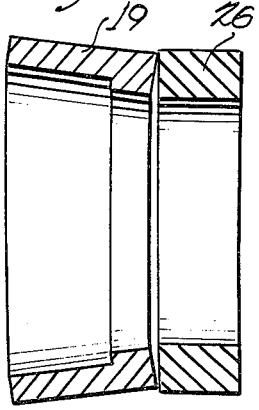
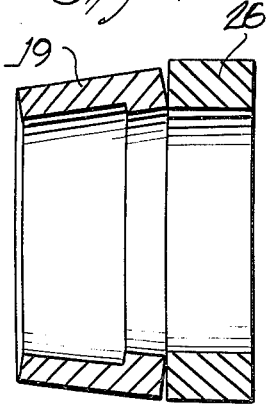
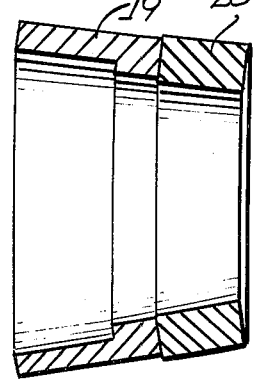

EXTERNALLY ADJUSTABLE MECHANICAL SEAL

BACKGROUND AND SUMMARY OF THE INVENTION

The present invention relates to mechanical seals, and more particularly to a mechanical seal which is adapted to seal a pump or other rotary shaft against leakage of high pressure fluids in the pump housing.

In investigating high pressure mechanical face seals, it was discovered that the originally flat seal surfaces will become distorted in use under the simultaneous effects of hydrostatic load and temperature gradient; this latter condition being caused by the dissipation of the friction heat at the sealing faces. Once a seal is installed, very little can be done about its performance; which is reflected by the developing friction torque, leakage and wear rate of surfaces for any given load-speed condition. A sealing member in the form of a cylindrical body with a constant wall thickness and having a constant hydrostatic load on the full exterior length of the sealing member results in the ring faces at the ends of the seal remaining planar. However, a partial hydrostatic load exerted adjacent one end of the sealing member will result in a concave face at the end of the body adjacent the hydrostatic load and a convex face at the opposite end. Also, where there is a thermal load in an axial direction of the cylindrical body with one end of the member at a higher temperature than the opposite end, the end of the sealing body adjacent the higher temperature will have a convex sealing surface while the face at the lower temperature end will have a concave sealing surface.

Every mechanical seal requires at least two sealing rings with two adjacent surfaces in sealing contact. Distortion may occur on either or both seal rings which would result in one of several basic relationships. Where there is a constant hydrostatic load along the external surfaces of both sealing rings, the adjacent sealing surfaces between the two rings will remain in a full face contact. Where one sealing ring remains cylindrical while the other sealing ring is distorted, either by a partial hydraulic load or an axial thermal load, resulting in a concave sealing face, the actual sealing contact will occur along the outer diameter area of the sealing faces. On the other hand, if one sealing ring is distorted to present a convex sealing face adjacent the undistorted ring, the sealing faces will be engaged along an internal diameter contacting area. If both sealing rings are distorted so that one sealing ring provides a concave sealing face and the other sealing ring provides a convex sealing face adjacent the concave face, a full face sealing contact will result.

Considering the fact that high pressure seal designs are normally associated with some degree of hydrostatic balancing, usually in the range of 60 to 90 percent, it is clear that in the case of a full face contact, the face contact pressure will be equal to the balance pressure. For an outer diameter face contact, the face contact pressure may be considerably larger than the balance pressure; while an inner diameter face contact will yield a normally smaller face contact pressure than either of the other two arrangements.

For any given seal system, an important goal is to reduce the friction heat occuring from the sliding contact of the sealing faces, and the obvious way to achieve this goal is to reduce the face contact pressure to minimum safe level. An important result of this will be a reduction in the heat distortion of the sealing rings. The present invention provides a mechanical seal design which will assure adjustment of the deformation of the seal faces after the seal has been installed and is functioning in the requisite structure. Such a sealing arrangement can be used for a rotating shaft of a pump or similar device whereby the pressure occurring at the intake and delivery sides of the pump are utilized to provide the externally controlled deformation of the seal face for the stationary sealing ring. This arrangement includes the establishment of hydrostatic pressure upon one or more areas of the exterior surface of the stationary seal ring so as to provide a desired deformation of the sealing ring to overcome deformation caused by either hydraulic or thermal conditions within the ring and at the rotating shaft.

The present invention comprehends a sealing ring arrangement wherein it is possible to provide conditions at will that would result in an inner diameter face contact, a full face contact, or an outer diameter face contact of the sealing faces. Also, a full face contact condition can now be changed to an inner diameter contact or an outer diameter contact depending on the conditions within the system. This system provides a rotary sealing ring mounted in a seal ring holder surrounding the rotating shaft, a stationary sealing ring mounted within a gland plate, and appropriate piping and valves to provide either a low pressure, a high pressure or an atmospheric pressure condition to the stationary sealing ring. The low and high pressure conditions can be appropriately obtained from a pump that is operated by the rotating shaft. The stationary sealing ring is preferably formed of a material having a low thermal expansion coefficient, while the rotary sealing ring may be of a hard metal or other suitable material which has a higher thermal expansion coefficient.

The present invention further comprehends a stationary sealing ring arrangement for use with a rotary sealing ring to provide appropriate face sealing contact wherein the cylindrical outer surface of the stationary sealing ring is divided into a pair of axially spaced areas separated by sealing O-rings so as to be hermetically sealed off from direct communication with the seal cavity containing a high pressure fluid. Each of the two areas, however, is connected through the proper piping and valves either to atmospheric pressure or to the intake side of the pump operated by the rotating shaft or to the delivery sides of the pump; thus providing three conditions of hydrostatic pressure. By appropriate control of the valves to the two spaced areas, an infinite number of co-working seal face configurations can be produced due to the possible variation of the hydrostatic loads applied to either area between atmospheric and up to delivery pressure. Thus, this arrangement is well suited to counterbalance thermal and hydrostatic load deformation of the rotating ring which, in an extreme case, may reach unsafe proportions, and separate the sealing faces. By controlling the sealing contact between the rotary and stationary rings, the friction heat caused by the contact of the rotating sealing surfaces will be reduced to decrease heat distortion thereof, and excessive wear of the sealing faces is also reduced to a minimum.

Further objects are to provide a construction of maximum simplicity, efficiency, economy, and ease of assembly and operation, and such further objects, advantages and capabilities as will later more fully appear and are inherently possessed thereby.

DESCRIPTION OF THE DRAWINGS

FIG. 1 is a schematic view of a rotating shaft for a pump or similar device showing appropriate piping and valving for hydrostatic control of the deformation of a sealing ring.

FIG. 2 is an enlarged vertical cross sectional view taken axially of the mechanical seal assembly with the rotating shaft being shown in side elevation.

FIG. 3 is a vertical cross sectional view through the rotating and stationary sealing rings showing an outer diameter face contact.

FIG. 4 is a vertical cross sectional view of the rotary and stationary sealing rings showing an inner diameter sealing contact.

FIG. 5 is a vertical cross sectional view showing a full face sealing contact wherein both the rotary and stationary sealing rings are distorted.

DESCRIPTION OF THE PREFERRED EMBODIMENT

Referring more particularly to the disclosure in the drawings wherein is shown an illustrative embodiment of the present invention, FIGS. 1 and 2 disclose a pump or other housing 10 having a shaft opening or passage 11 through which extends a rotary shaft 12. Secured to the other face of the housing 10 by suitable fastening means (not shown) is a gland plate 13 having a central opening 14 therein through which a reduced diameter portion 15 of the shaft 12 extends. The pump housing includes a fluid intake conduit 16 leading into the pump and a fluid outlet conduit 17 on the high pressure or delivery side of the pump.

The gland plate opening 14 is counterbored as at 18 to receive a stationary sealing ring 19 disposed about the reduced portion 15 of the shaft 12 and having an annular sealing face 21 extending into the cavity 22 defined by the pump housing 10. The rotary shaft 12 is shouldered at 23 to define the reduced diameter portion 15, and a rotary sealing ring holder 24 slidably engages the shaft 12 and extends beyond the shoulder 23 toward the gland plate 13. The holder is counterbored at 25 to receive a rotary sealing ring 26 which extends beyond the outer end of the holder to terminate in an annular sealing face 27. The sealing ring 26 is disposed about the reduced portion 15 of the shaft 12 and is sealingly mounted within the holder by O-rings 28 received in spaced grooves in the counterbored portion 25.

The sealing ring holder 24 has a counterbore 29 at the opposite end thereof to receive a static seal 31 formed of a suitable elastomeric material; the rear edge of the holder being formed with a plurality of circumferentially spaced axially extending drive lugs 32 which project into complimentary slots 34 formed in the outer periphery of a spring housing 33. The counterbore 29 in the body of the holder 24 provides an annular space between the holder and the shaft, in which is disposed the static seal 31 in the form of a U-cup packing which is pressed into sealing engagement with a seat 35 in the holder and expanded into engagement with the shaft 12 and with the inner periphery of the holder 24 as by means of a wedge-like expander 36 formed on the inner end of the spring housing 33.

The spring housing includes the wedge-like expander 36 and a cylindrical portion 37 extending rearwardly thereform and spaced radially outwardly of the shaft 12. A spring retainer ring 38 is suitably secured to the shaft by circumferentially spaced set screws (not shown), and a plurality of drive pins 39 having enlarged heads 41 received in slots 42 in the retainer ring 38 extend beyond the outer circumference of the ring and into longitudinally extending elongated slots 43 in the cylindrical portion 37 of the spring housing 33. The outer ends 44 of the drive pins 39 cooperate with the slots 43 to guide the axial movement of the spring housing. A compression spring 45 is mounted within the cylindrical portion 37 with one end abutting the spring retainer ring 38 and the opposite end abutting a shoulder 46 on the wedge-like expander 36.

As seen in FIG. 2, the spring retainer ring 38 is secured onto the surface of the rotating shaft 12 and rotates therewith. The spring housing 33 is axially movable relative to the shaft 12 and rotates therewith due to the engagement between the outer ends 44 of the drive pins 39 in the retainer ring 38 and the elongated slots 43 in the spring housing 33. Also, the rotary sealing ring 26 and the seal ring holder 24 are axially movable along the rotating shaft and rotate therewith due to the engagement of the drive lugs 32 on the holder in the slots 34 in the spring housing 33. Likewise, the static seal 31 frictionally engages and rotates with the shaft 12 and is capable of axial movement relative to the shaft along with the sealing ring holder 24 and the expander 36 on the inner end of the spring housing 33.

The stationary sealing ring 19 is mounted in the counterbore 18 of the gland plate 14 and is sealed against leakage by the spaced O-rings 47, 48 and 49 received in spaced grooves formed in the gland plate; the spaced O-rings dividing the cylindrical outer surface of the sealing ring into a first area 51 and a second area 52. These two areas are hermetically sealed off from direct communication with the seal cavity 22 containing the high pressure fluid or liquid. These areas are, however, connected by suitable passages to appropriate piping and valves to provide communication to either the atmosphere or the intake side of the pump or the delivery side of the pump; such passages being indicated as 53 and 54 in the gland plate 13.

As more clearly seen in FIG. 1, the intake conduit 16 is connected through a delivery line 55 to a pair of branches 56 and 57 leading to the areas 51 and 52 of the stationary ring. A first valve 58 is positioned in the delivery line 55 between the branches 56 and 57 to control low pressure fluid to area 52, and a second valve 59 is mounted in the branch 56 to control low pressure fluid to the area 51. An extension or branch 61 is a continuation of the branch 57 from its connection with the delivery line 55 and communicates with the atmosphere; a third valve 62 being located in the extension 61. An extension or branch 63 communicating with the atmosphere is connected into the branch 56 between the second valve 59 and the area 51 and a fourth control valve 64 is located in the extension 63.

A high pressure delivery line 65 communicates between the fluid outlet conduit 17 at the delivery side of the pump and the branches 66 and 67 communicating with the areas 51 and 52, respectively. A fifth control valve 68 is located in the branch 66 and a sixth control valve 69 is located in the branch 67.

In the operation of the above described mechanical seal, fluid is present in the cavity 22 of the pump housing 10 at a relatively low pressure when the pump is not operating. At this time, the static seal 31 prevents leakage of fluid along the shaft 12 past the shoulder 23 and into the opening 14 in the gland plate 13. Also, the compression spring 45 urges the sealing face 27 of the sealing ring 26 against the sealing face 21 of the sealing ring 19 to prevent any leakage therebetween. When the shaft 12 is rotated to operated the pump mechanism, thus taking low pressure fluid from the intake conduit 16 and providing a high pressure fluid through the delivery conduit 17 at the delivery side of the pump, fluid at a relatively high pressure will be present in the cavity 22 and the static seal 31 and the rotary sealing ring 26 cooperating with the stationary sealing ring 19 will prevent leakage of this high pressure fluid beyond the sealing members.

The rotary sealing ring 26 is preferably formed of a hard, wear resistent material, such as tungsten carbide or Stellite, and the stationary sealing ring 19 is preferably formed of a material having a relatively low modulus of elasticity with a very low thermal expansion coefficient, such as carbon, which will readily respond to axial-asymmetrical loading by a relative large distortion. With this arrangement, it is now possible to provide at will, conditions which will result in an inner diameter contact, a full face contact or an outer diameter contact of the sealing faces 21 and 27 of the sealing rings whenever desired.

As an example, a full face contact condition, as shown in FIG. 2, can now be changed to an inner diameter contact by connecting area 51 to either atmospheric or the lower intake pressure, while area 52 is connected to the delivery pressure. This would be accomplished by opening the sixth control valve 69 and either valve 59 or 64 and closing the valves 68, 58 and 62. This will produce a mechanical loading of the stationary sealing ring 19 to a condition as shown in FIG. 4 with the effect demonstrated as "opposing face convex."

If the hydrostatic loading of area 51 and area 52 is reversed, then the original full face contact will change to an outer diameter contact as shown in FIG. 3 with the effect demonstrated as "opposing face concave." To achieve this reverse hydrostatic loading of the areas 51 and 52, control valves 68 and either 59 or 62 are opened and valves 69, 58 and 64 are closed. This last mentioned arrangement is well suited to counterbalance thermal deformation of the rotating sealing ring 26, which alone as described would cause internal diameter running. If this effect reaches an unsafe proportion, the sealing faces may separate. To counteract the thermal deformation of ring 26, area 51 will be loaded and area 52 will be free of any load; the result in extreme being similar to that shown in FIG. 5.

Due to the possible variations of hydrostatic load applied to either area 51 or 52 between atmospheric and up to delivery pressure, an infinite number of coworking seal face configurations can be produced. The following table illustrates several pressure levels and the valve settings to obtain the desired pressure for either of the involved areas:

TABLE 1

| VALVE SETTINGS FOR PRESSURES | |
|---|---|
| AREA 51 | AREA 52 |
| FULL HIGH PRESSURE | |
| Valve 68 — Open | Valve 69 — Open |
| Valve 59 — Closed | Valve 58 — Closed |
| Valve 64 — Closed | Valve 62 — Closed |
| PARTIAL HIGH PRESSURE | |
| Valve 68 — Open | Valve 69 — Open |
| Valve 59 — Partially Open | Valve 58 — Partially Open |
| Valve 64 — Closed | Valve 62 — Closed |
| FULL INTAKE PRESSURE | |

TABLE 1-continued

| VALVE SETTINGS FOR PRESSURES | |
|---|---|
| AREA 51 | AREA 52 |
| Valve 68 — Closed | Valve 69 — Closed |
| Valve 59 — Open | Valve 58 — Open |
| Valve 64 — Closed | Valve 62 — Closed |
| PARTIAL INTAKE PRESSURE | |
| Valve 68 — Closed | Valve 69 — Closed |
| Valve 59 — Open | Valve 58 — Open |
| Valve 64 — Partially Open | Valve 62 — Partially Open |
| ATMOSPHERIC PRESSURE | |
| Valve 68 — Closed | Valve 69 — Closed |
| Valve 59 — Closed | Valve 58 — Closed |
| Valve 64 — Open | Valve 62 — Open |

It is obvious from the above table that an infinite number of pressure levels can be obtained for area 51 and/or area 52 depending upon the adjustment of the valves for each area. Thus, any desired face sealing contact of the sealing rings can be easily obtained by an external adjustment of the hydrostatic pressures applied to the areas 51 and 52 without disassembly or removal of the seal structure.

I claim:

1. An externally adjustable sealing device comprising a rotary cylindrical sealing ring, a stationary cylindrical sealing ring having an external cylindrical surface, each ring having an annular end sealing face, biasing means urging the rotary sealing ring toward the stationary sealing ring to engage said sealing faces, said cylindrical external surface being divided into a pair of axially spaced areas, and passage means for applying separate hydrostatic pressures solely to each of said axially spaced areas to adjust the sealing face contact between the members.

2. An externally adjustable sealing device comprising a rotary cylindrical ring, a stationary cylindrical ring having an external cylindrical surface divided into a pair of axially spaced areas, each ring having an annular sealing face, biasing means urging the rotary ring toward the stationary ring to engage said sealing faces, and means for applying hydrostatic pressure to each of said axially spaced areas to adjust the sealing face contact between said rings including a high pressure line communicating with a source of high pressure and having branches leading to each of said axially spaced areas, a low pressure line communicating with a source of low pressure and having branches leading to each of said axially spaced areas, and a branch communicating between each of said axially spaced areas and atmospheric pressure.

3. An externally adjustable sealing device as set forth in claim 2, including a control valve in each of said branches to control the application of hydrostatic pressure to each of said spaced areas.

4. An externally adjustable sealing device as set forth in claim 2, in which said stationary ring is formed of a material with a relatively low modulus of elasticity having a low thermal coefficient of expansion which will readily respond to an axial-asymmetric load by a relatively large distortion.

5. An externally adjustable sealing device as set forth in claim 4 in which the face sealing contact between the two rings can be adjusted from a full face contact to the limits of an inner diameter contact or an outer diameter contact depending on the hydrostatic loading of the axially spaced areas.

6. An externally adjustable sealing device for a housing having a shaft opening and a shaft rotatable in said opening, comprising relatively rotatable sealing means connectible to said shaft and to said housing for sealing said opening, said sealing means including a rotary cylindrical sealing ring operatively connected to said shaft and a stationary cylindrical sealing ring mounted in said housing and having an external cylindrical surface divided into a pair of axially spaced areas hermetically sealed from each other, said sealing rings having facing annular sealing faces, biasing means urging said rotary sealing ring toward said stationary sealing ring to engage said sealing faces, and passage means for applying separate hydrostatic pressures to each of said axially spaced areas to adjust the face sealing contact between the sealing rings.

7. An externally adjustable sealing device for a housing having a shaft opening and a shaft rotatable in said opening, comprising relatively rotatable sealing means connectible to said shaft and to said housing for sealing said opening, said sealing means including a rotary cylindrical sealing ring operatively connected to said shaft and a stationary cylindrical sealing ring mounted in said housing and having a cylindrical external surface divided into a pair of axially spaced areas hermetically sealed from each other, said sealing rings having facing annular sealing faces, biasing means urging said rotary sealing ring toward said stationary sealing ring to engage said sealing faces, and passage means for applying separate hydrostatic pressures to each of said axially spaced areas to adjust the face sealing contact between the sealing rings, including a source of high pressure communicating with each area, a source of low pressure communicating with each area, and means connecting each area with atmospheric pressure.

8. An externally adjustable sealing device as set forth in claim 7, in which said shaft is connected to a rotary pump having a low pressure intake side and a high pressure delivery side, said intake and delivery sides forming the low pressure and high pressure sources, respectively.

9. An externally adjustable sealing device for a housing having a shaft opening and a shaft rotatable in said opening, comprising relatively rotatable sealing means connectible to said shaft and to said housing for sealing said opening, said sealing means including a rotary cylindrical sealing ring operatively connected to said shaft and a stationary cylindrical sealing ring mounted in said housing and having a cylindrical external surface divided into a pair of axially spaced areas hermetically sealed from each other, said sealing rings having facing annular sealing faces, biasing means urging said rotary sealing ring toward said stationary sealing ring to engage said sealing faces, and means for applying hydrostatic pressure to said axially spaced areas to adjust the face sealing contact between the sealing rings, including a source of high pressure, a high pressure line communicating with said high pressure source and having separate branches leading to each of said areas, a source of low pressure, a low pressure line communicating with said low pressure source and having branches leading to each of said areas, branches communicating with said areas and leading to a source of atmospheric pressure, and a control valve in each branch.

10. An externally adjustable sealing device for a housing having a shaft opening and a shaft rotatable in said opening, comprising relatively rotatable sealing means connectible to said shaft and to said housing for sealing said opening, said sealing means including a rotary cylindrical sealing ring operatively connected to said shaft and a stationary cylindrical sealing ring mounted in said housing and having a cylindrical external surface divided into a pair of axially spaced areas hermetically sealed from each other, said sealing rings having facing annular sealing faces, biasing means urging said rotary sealing ring toward said stationary sealing ring to engage said sealing faces, said stationary sealing ring being formed from a material having a relatively low modulus of elasticity with a low thermal coefficient of expansion that will readily respond to an axial-asymmetrical load by a relatively large distortion, said shaft being connected to a rotary pump having a low pressure intake side and a high pressure delivery side, means for applying hydrostatic pressure to said axially spaced areas including a high pressure line communicating with said pump delivery side and having branches leading to said spaced areas, a low pressure line communicating with said pump intake side and having branches leading to said areas, and branches connecting said areas to atmospheric pressure, and a control valve located in each branch to independently control the pressure exerted on each area to adjust the face sealing contact between the sealing ring.

11. An externally adjustable sealing device as set forth in claim 10, in which said face sealing contact between the faces of the two sealing rings is adjustable from a full face sealing contact to the limits of an inner diameter contact or an outer diameter contact depending on the hydrostatic loading on the external surface of the stationary sealing rings.

12. An externally adjustable sealing device as set forth in claim 11, in which said stationary sealing ring is sealingly mounted in said housing to define the opening therethrough, said rotary sealing ring slidably encompasses said shaft for axial movement relative thereto, a rotary sealing ring holder slidably encompassing said shaft for axial movement relative thereto and receiving said rotary sealing ring therein, said holder having a generally annular seat formed therein opposite said rotary sealing ring, a resilient static seal received on said seat, and an expander biased by said biasing means toward said static seal to engage and expand said static seal into sealing engagement with said holder and said shaft.

13. An externally adjustable sealing device as set forth in claim 12, wherein said rotary sealing ring, said sealing ring holder, said static seal and said expander all rotate with said shaft.

14. An externally adjustable sealing device as set forth in claim 6, including a sealing ring holder slidably received on said shaft and receiving the rotary sealing ring therein.

* * * * *